Aug. 8, 1933.                A. F. GAUGER                1,921,519
                              WINDSHIELD
                           Filed Aug. 30, 1930
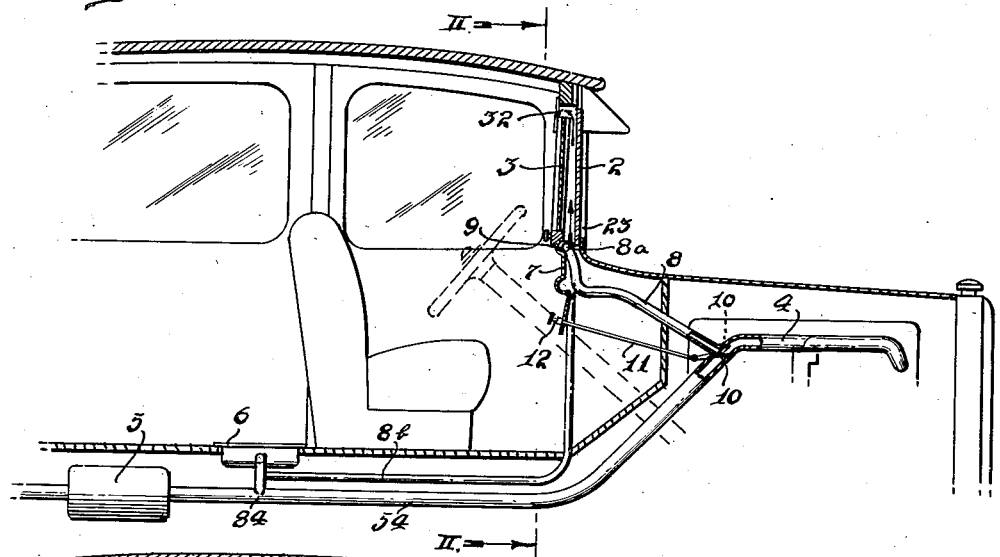
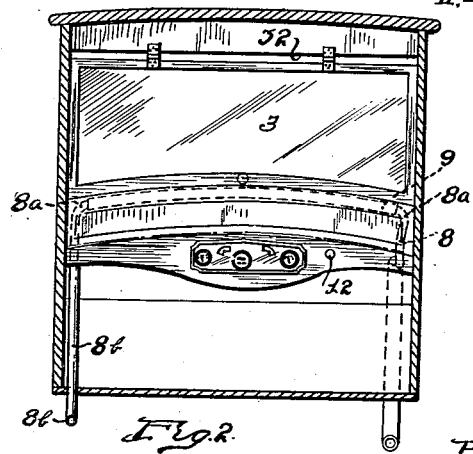
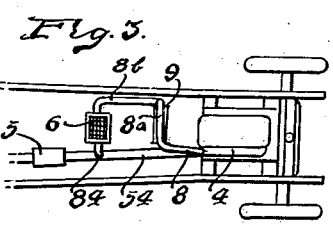
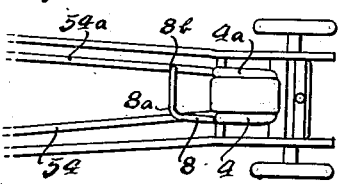
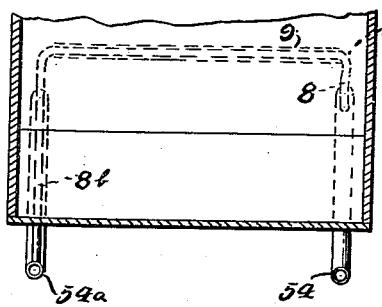
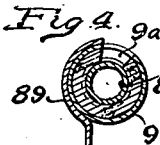
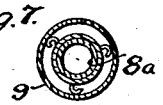
INVENTOR.
ALBERT F. GAUGER
BY
ATTORNEY.

Patented Aug. 8, 1933

1,921,519

UNITED STATES PATENT OFFICE 1,921,519

WINDSHIELD

Albert F. Gauger, Detroit, Mich.

Application August 30, 1930. Serial No. 478,842

3 Claims. (Cl. 20—40.5)

My invention relates to wind-shield heaters and an object of my improvement is to provide an improved and practicable apparatus for keeping the wind-shield of automobiles warm, so that ice or snow will not acumulate thereon.

I secure this object in the device illustrated in the acompanying drawing, in which:—

Figure 1 is an elevation partly in section of an apparatus embodying my invention and so much of an automobile as is necessary to illustrate its connection therewith.

Figure 2 is a section in the plane indicated by the line 2, 2, Figure 1, looking in the direction of the arrows.

Figure 3 is a plan to a reduced scale, the body of the automobile being omitted.

Figure 4 is a detail sectional elevation of the instrument board and heating pipe.

Figure 5 is a partial sectional view similar to Figure 2, showing a modified construction.

Figure 6 is a plan view similar to Figure 3, illustrating the modified construction of Figure 5.

Figure 7 is a detail sectional view of the pipes 8a and 9 illustrating a modified construction.

2 is the wind-shield. 3 is a glass plate enclosed in a frame and secured at its upper edges, so as to lie adjacent and approximately parallel to the wind-shield 2, and spaced a short distance from said shield.

4 is the exhaust manifold and 5 is the muffler. 54 is an exhaust pipe connecting the manifold 4 and the muffler 5. 6 is a heater for the automobile, which may be located in any conventional position.

7 is the instrument board. 8 is a pipe connecting with the exhaust manifold 4 or with the exhaust pipe 54 at one end, preferably adjacent to the point at which the exhaust pipe joins the manifold. At this point there is a valve 10 adapted to be oscillated by a connecting rod 11, from a convenient handle 12 upon the instrument board 7, to control the area of opening to the pipe 8 or exhaust pipe 54.

The pipe 8 extends from the junction with the exhaust passage upward and backward and then turns and extends across the automobile in a portion 8a located between the lower edge of the plate 3 and the wind-shield 2.

The portion 8a of the pipe 8 is surrounded by a larger pipe 9 and the space betwen the two pipes is filled, or partly filled, with asbestos or similar material 89, as most distinctly shown in Figure 4. The pipe 9 is cut away to form a slot 9a extending above the pipe 8a and the asbestos packing 89 may be similarly cut away if desired, as indicated in Figure 4.

If desired the asbestos filling may be omitted and a ring with spacing lugs may be placed upon the part 8a of the pipe 8 as illustrated in Figure 7.

The pipe 8 extends in the portion 8a across the body of the automobile then bends downward at the further side then bends backward as shown at 8b, Figure 1, and enters the heater 6, which is connected with the exhaust pipe 54 at 84. Of course the portion 8b of the pipe 8 may connect directly with the exhaust pipe 54, if desired, instead of first passing through the heater 6.

The operation of the above described device is as follows:

The engine being in operation discharges the hot exhaust gases into the manifold 4 which gases are usually conveyed through the pipe 54 to the muffler 5 and then discharged.

The valve 10 is adjusted to a position by the handle 12 so as to partly close, if desired, the opening from the manifold to the exhaust pipe 54, leaving the entrance to the pipe open or partly open. The hot exhaust gases are then conveyed partly through the pipe 8 and through the portion 8a thereof, where they give up their heat to the adjacent air, which rises between the wind-shield 2 and plate 3 at 23, imparting heat to the shield 2 as it rises and preventing the formation of ice or the adherence of snow thereto. The warm air then passes out through the opening 32 into the body of the automobile.

The exhaust gases having passed through the part 8a, pass downward and through the part 8b where they may pass into the heater 6 and from thence, into the exhaust pipe 54 at 84.

If desired, the handle 12 may be manipulated so as to throw the opening to the exhaust pipe 54 wide open and close the entrance to the pipe 8, as shown in broken lines in Figure 1. In this case, the heating apparatus will be thrown out of operation. The adjustment of the valve 10 at an intermediate position will throw a portion of the exhaust gases through the pipe 8, 8a, 8b, as may be desired.

In an omnibus there is usually an exhaust manifold upon each side of the engine as indicated at 54, 54a, Figure 5, the construction being entirely similar upon both sides. In this case, the pipe 8 is connected, as above described, upon one side and passes across and communicates with the exhaust pipe 54a, at a point more remote from the engine, upon the opposite side of the vehicle as shown in Figures 5 and 6.

In the use of the above described apparatus, vapor or steam does not condense upon the glass.

What I claim is:—

1. In an automobile having an engine, the combination of a wind-shield, a sheet of glass located parallel, adjacent to, and spaced from said wind-shield, an exhaust passage from said engine, a pipe communicating with said exhaust passage and extending adjacent to the lower edges of said sheet of glass and the wind-shield substantially as, and for the purpose described.

2. In an automobile having an engine, the combination of a wind-shield, a sheet of glass located parallel, adjacent to, and spaced from said wind-shield, an exhaust passage from said engine, and a conduit communicating with said exhaust passage and passing to a position to heat the space between said wind-shield and sheet of glass without communicating therewith.

3. In an automobile having an engine, the combination of a wind shield, an instrument board located below and horizontally spaced from said wind shield, a sheet of glass rising from the upper edge of said instrument board and extending parallel and spaced from said wind shield leaving an open space above the upper edge of said sheet of glass, an exhaust passage from said engine and a conduit communicating with said exhaust passage and passing within and adjacent to the upper edge of said instrument board beneath the space between the lower edges of said sheet of glass and said wind shield, substantially as and for the purpose described.

ALBERT F. GAUGER.